July 29, 1952          C. W. BERTHIEZ          2,604,700
AMPLIFYING INDICATOR FOR THE TRAVEL OF MOVABLE MACHINE PARTS
Filed Aug. 17, 1946          4 Sheets-Sheet 1
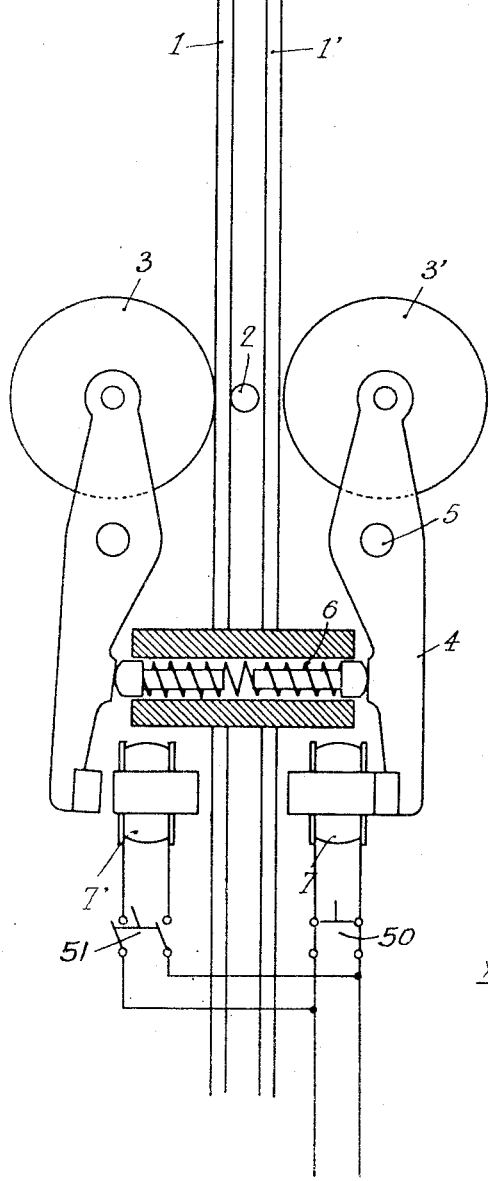
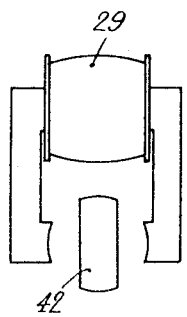
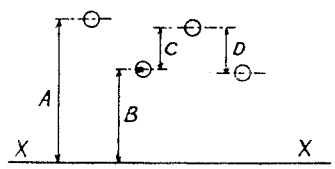
Charles William Berthiez
INVENTOR
By George H. Corey
His Attorney

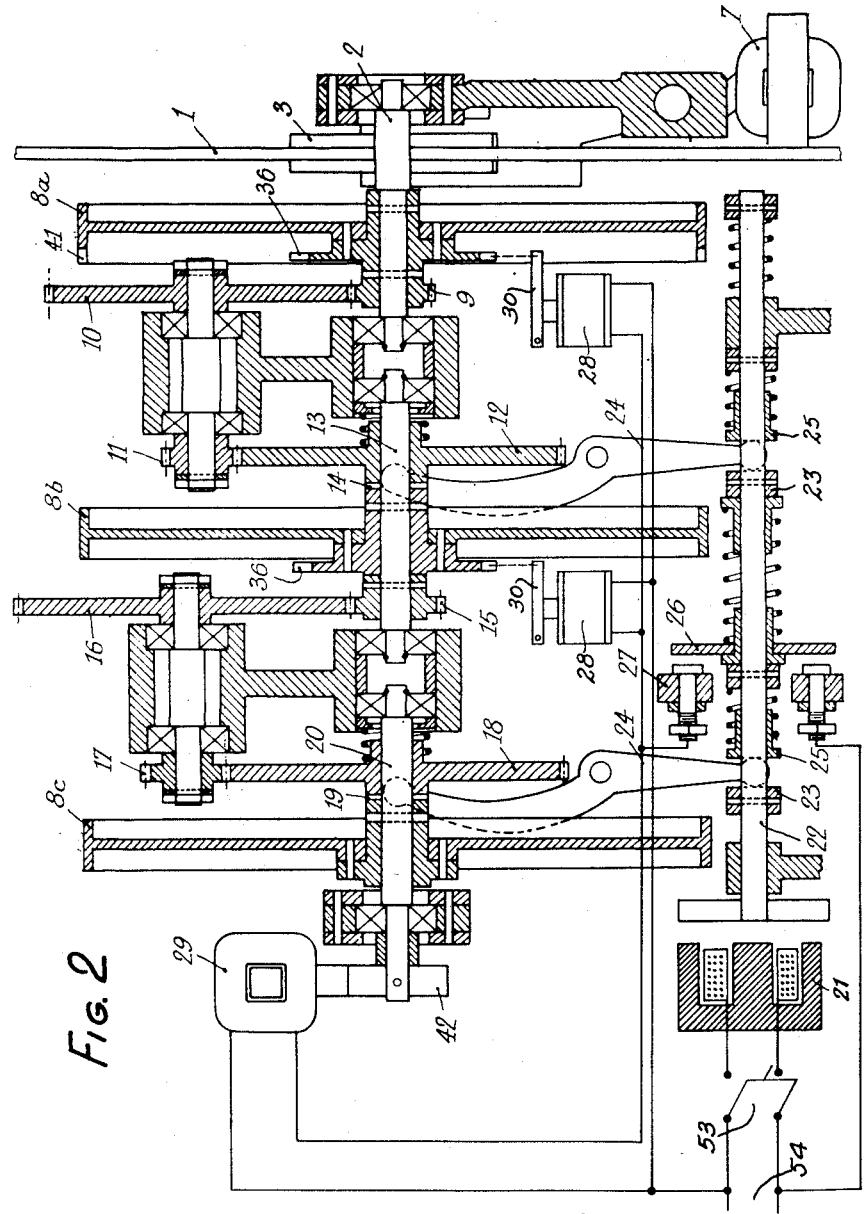

July 29, 1952 C. W. BERTHIEZ 2,604,700
AMPLIFYING INDICATOR FOR THE TRAVEL OF MOVABLE MACHINE PARTS
Filed Aug. 17, 1946 4 Sheets-Sheet 3
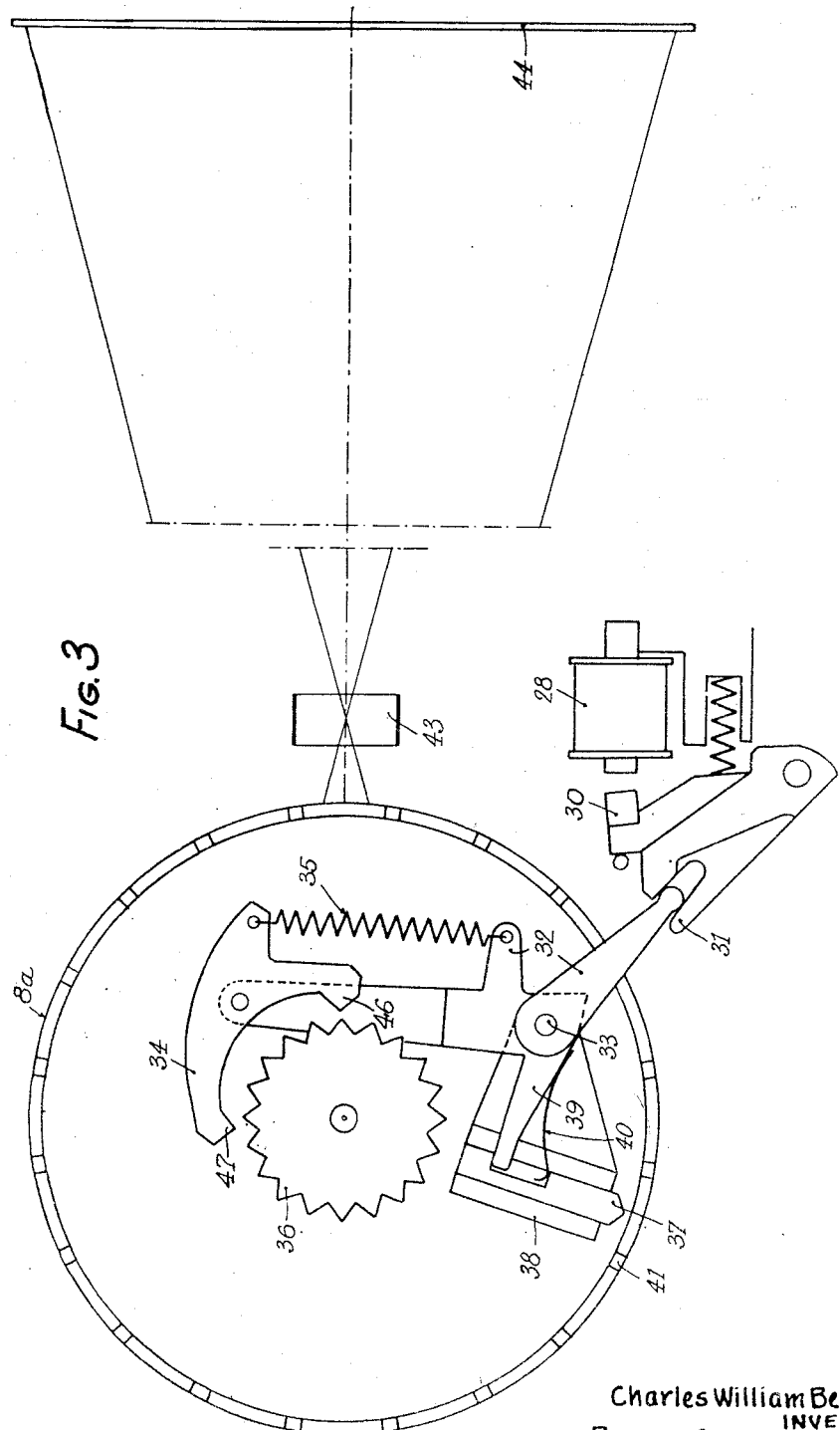
Charles William Berthiez
INVENTOR
By George H. Corey
His Attorney July 29, 1952     C. W. BERTHIEZ     2,604,700
AMPLIFYING INDICATOR FOR THE TRAVEL OF MOVABLE MACHINE PARTS
Filed Aug. 17, 1946     4 Sheets-Sheet 4

Charles William Berthiez
INVENTOR
By George H. Cooley
His Attorney

Patented July 29, 1952

2,604,700

UNITED STATES PATENT OFFICE 2,604,700

AMPLIFYING INDICATOR FOR THE TRAVEL OF MOVABLE MACHINE PARTS

Charles William Berthiez, Paris, France

Application August 17, 1946, Serial No. 691,363
In France October 9, 1945

11 Claims. (Cl. 33—141)

The travel of a moving part or member of machine such as a machine-tool, for instance, is measured generally by means of a graduated scale in cooperation with a suitable index.

Such an arrangement does not allow a high degree of accuracy of the machining performed on the machine, and exceptional attention on the part of the operator and an unremitting care are required since, on the one hand, there is the necessity for a frequent cleaning of the scales that soon become soiled, and, on the other hand, the operator must look closely at the scales if he wants to read carefully the extent of the travel.

With a view to increasing the accuracy of the indication, some machine-tool builders have suggested to design a suitable transmission for the recording of the travel of the moving part on a round dial which is not read directly but is viewed through a magnifying device.

This proposal forms a definite step forward over the usual devices with graduated scales; however, it does not provide a complete answer to the problem, since it does not allow the attainment of the meticulous accuracy that is demanded nowadays in some machining work, i. e. an accuracy of the degree of $1/100$ mm. Moreover, this arrangement presents the drawback of allowing an additional risk of mistake to creep in because of the transmission between the recording dial and the moving machine part or member.

Moreover, it calls for particular care on the part of the operator who has to look through the eye-piece of the optical device. This leads to some loss of time and occasional mistakes if the readings are made too hastily.

The indicating device of my invention eliminates these disadvantages and provides apparatus of the highest accuracy although easy to handle.

The device of the invention makes it possible for the operator to read from a distance, and at any time, with respect to a datum line the travel measured in $1/100$ mm. of a moving member or part, such as a carriage, a spindle, etc., of a machine-tool. It is to be understood, however, that the invention can be applied to other kinds of machines.

The device under consideration also possesses the advantage of being resettable to zero, thus providing for the positioning of a new datum line at any point of the travel of the moving member.

Moreover, this device provides for adding and subtracting the distances travelled by the moving member in both directions.

In accordance with a primary object of the invention the travel indicator carries a control roller the axis of which is fixed with respect to or moves concomitantly with the moving member of the machine and that is capable of rolling on a raceway fixed lengthwise thereof in relation to another member of the machine relative to which the moving member is moved, and the length of the raceway extending along the path of movement of this moving member. A rotational movement is imparted by the roller to a register or indicator connected thereto. This register may comprise a set of graduated indicator drums to which the roller is connected either directly or through a transmission, the first graduated drum showing the travel in the lowest unit (for instance in $1/100$ mm.) and the last in the highest unit (for instance in centimeters).

According to another object of the invention, the graduated drums are illuminated and their divisions are projected on a screen by a magnifying optical device.

A third object is to provide a presser roll mounted on the moving member of the machine opposite the control roller already mentioned, and adapted to effect contact between the control roller and its raceway.

According to a fourth object of the invention, a double raceway is provided and the control roller may engage one raceway or the other, for instance, a given raceway for the forward travel and the other for the return motion.

A fifth object consists in a device for the resetting of this register to zero, to bring back at any time the set of graduated drums to the zero mark.

Additional objects and advantages of my invention will become apparent from the following explanation and from the examination of the accompanying drawings that illustrate in a diagrammatic way and as an example only an embodiment of the invention.

In the drawings:

Fig. 1 is an elevational view of the control parts of a travel indicator embodying the invention.

Fig. 2 is a section of the device with certain parts in elevation and shows the mechanical driving connection between the control roller and the various graduated drums.

Fig. 3 is an elevational view showing the interior of one of the graduated drums together with the device for the resetting to zero and the optical projection device.

Fig. 4 is an elevational view of the means for resetting the last graduated drum.

Fig. 6 is a diagram showing the spacings of holes to be drilled in a workpiece, this diagram being given as an example to demonstrate the ease of operation of the device according to the invention.

Figure 5:
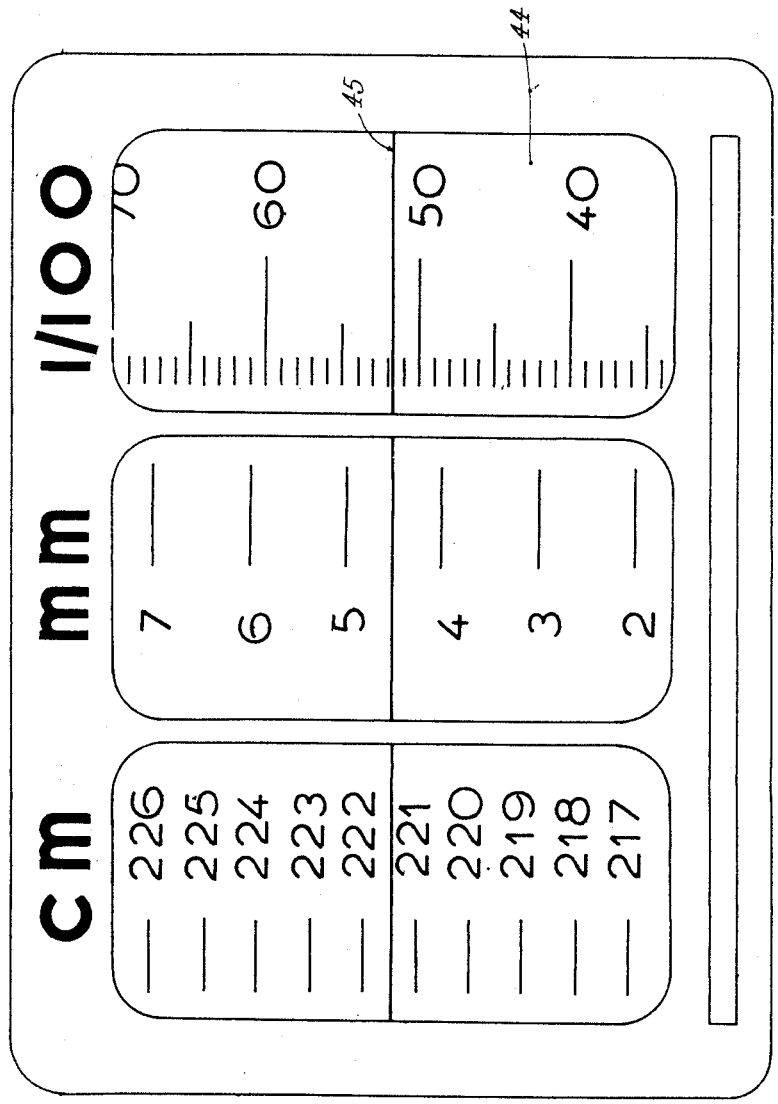
Fig. 5 is a front view of the projection screen.

The main features of the indicating device according to the invention include a raceway mounted preferably on a fixed member of the machine, a roller driving a number of graduated wheels or drums, and finally an optical device that projects on a screen the illuminated divisions of the drums, the assembly constituted by the roller, the drums, the optical device and the screen being fixed to the moving member or part the travel of which is to be measured.

In the embodiment illustrated, the raceway consists (see Fig. 1) of two piano wires 1—1' tightly drawn and parallel to the slideway of the machine tool on which the moving member of the machine travels. Between the taut wires 1—1' a control roller 2 rotatable in supports carried by the moving member of the machine can travel lengthwise of these wires and its contact with the respective wires is secured by means of presser rolls 3 and 3'. Each of these rolls is mounted at the end of a lever 4 pivoted at 5 and normally urged by a spring 6 that forces the roll 3 or 3' against the corresponding piano wire 1 or 1' to move this wire laterally into contact with the roller 2. Upon the energization of an electromagnet 7 or 7' connected to the lever at the end thereof opposite to the presser roll, the presser roll 3 or 3' is drawn away from its wire 1 or 1'. Fig. 1 shows the wire 1 pressed into contact with the roller 2 and wire 1' released from such contact. Thus, the control roller 2 may be made to cooperate with either wire 1 or 1' and, as a result, may be caused to rotate in one or the other direction for a given direction of travel of the moving part.

It is usual, however, to employ one of the wires for the travel in one direction, for instance, the forward motion and the other for the opposite direction, or backward motion. In such a case the roller 2 will rotate in the same direction for forward and return travel.

For the purpose of thus selectively bringing the wire raceway into contact with the roller 2, the electro-magnets 7 and 7' are connected respectively through switches 50 and 51 to an electrical supply, as shown in Fig. 1. These switches may be operated by hand to deenergize the electro-magnet corresponding to the wire selected to be moved into engagement with the roller 2.

Fig. 2 illustrates a device embodying the invention in which the control roller 2 drives three drums 8a, 8b, 8c. The first drum 8a is keyed on the shaft of the roller 2 and directly driven thereby, the drum 8a being used, for instance, for the reading of the travel in $\frac{1}{100}$ mm. The graduated divisions on this drum will read from 1 to 100 and a plurality of such sets or series may be provided in the ratio of the total number of divisions on the drum to 100. In order to illustrate, if, for instance, 2000 divisions are provided on the drum 8a, then the sets of graduated divisions 1 to 100 will recur twenty times. In this case, the circumference of the control roller 2 should be exactly 20 mm. so that a movement of one division of the drum corresponds to a travel of $\frac{1}{100}$ mm.

It is to be noted that as the drum 8a which carries divisions of $\frac{1}{100}$ mm. is connected directly to the control roller without any intermediate gear or similar transmission member, the apparatus possesses a degree of accuracy never attained in prior types.

The second drum 8b is also driven by the control roller 2, but through a reduction gear train composed of the toothed wheels 9, 10, 11 and 12. The last toothed wheel 12 is mounted loose on its shaft 13 and includes a clutch device 14, for instance, a claw coupling, for connecting this wheel to the drum 8b which is keyed on the shaft 13. This second drum will be used, for instance, for the measurement of the travel in millimeters. The divisions on this drum will read from 1 to 10 and will recur as many times as required. In the case contemplated where the circumference of the control roller 2 is 20 mm., and with a gear ratio of the wheels 9 and 12 of $\frac{1}{15}$, it will be necessary to have a total of 300 divisions on the drum 8b and the set of divisions 1 to 10 will recur thirty times.

The third drum 8c is also driven by the control roller 2 through the above gear train 9, 10, 11, 12 associated with a second reduction gear train consisting of toothed wheels 15, 16, 17 and 18, a clutch 19 being provided between the drum 8c and the last toothed wheel 18 which is mounted loose on the shaft 20. The drum 8c will be used for the measurement of the travel in centimeters. If, for instance, the gear ratio between the drums 8b and 8c is $\frac{1}{18}$ and if again, as stated above, the control roller 2 has a circumferential length of 20 mm. then the total number of divisions on the drum 8c will be 540, each one of these divisions corresponding to a travel of one centimeter.

An electro-magnet 21, when energized by closing switch 53, Fig. 2, to connect this electro-magnet to the supply 54, releases the drums 8b and 8c concomitantly with the operation of the resetting device in accordance with a procedure that will be explained further on. The armature of the electro-magnet is rigidly attached to a sliding rod 22 on which are pinned stops 23 against which forks 24 are urged by spring and sleeve devices 25. These forks are adapted to shift the toothed wheels 18 and 12 along their respective shafts 20 and 13 and consequently to make them engage or disengage the graduated drums 8c and 8b.

The rod 22 carries also a contact bar 26 adapted to engage the contacts carried by a terminal plate 27 when the declutching electro-magnet 21 is energized. These contacts and the bar 26, as shown in Fig. 2, bring about the contact required for closing the circuit of the electro-magnets 28 and 29 for the resetting of the drums 8a, 8b and 8c, as will be disclosed hereafter.

The electro-magnets 28 respectively associated with the drums 8a and 8b have the armatures 30 thereof operatively connected, as shown diagrammatically by the dotted lines in Fig. 2, with the respective resetting toothed wheels 36 fastened to and rotatable with the drums 8a and 8b. The electro-magnet 29 serves to reset the drum 8c to zero as described hereafter. The electro-magnets 28 and 29 are connected in parallel to the supply 54 through the contacts carried by the terminal plate 27 and the contact plate 26 associated therewith, as shown by the circuit of Fig. 2.

The electro-magnets 28 control the resetting of the graduated drums 8a and 8b through a mechanism shown in Fig. 3. The pivoted armature 30 of this electro-magnet actuates through a fork 31 a lever 32 that can turn about a shaft 33. The lever 32 has an upwardly extending arm which carries a double pawl 34 on which the spring 35 acts. Upon energizing of the magnet 28, the upper end of lever 32 moves to the left in Fig. 3. If the right hand point 46 of the pawl hits the point of a tooth of the wheel 36, the left hand point 47 of the pawl is disposed at such a distance from the point 46 that point 47 will move into engagement with a tooth of the wheel 36 and will push the wheel around in the counter clockwise direction a short distance, thus letting point 46 of the pawl into the notch between the teeth so it may reach the bottom of this notch and thereby determine the position of the lever 32 relative to the roller 2. The pawl acts, therefore, with the toothed wheel 36 in unison with the rotation of the drum 8a or 8b with which it is associated. The number of teeth on this wheel 36 equals the number of times that the sets of graduations recur on the drums 8a and 8b. For instance, according to the above assumption in which the drum 8a reads in 1/100 mm. and the divisions 1 to 100 recur twenty times, the wheel 36 will carry twenty teeth so that each time a pawl engages this wheel it moves it up to the complete engagement of the tip of the pawl 46 in the bottom of an interdental space, with the result of bringing the corresponding graduated drum to the mark or back to zero.

However, as this engagement might not have the definite degree of accuracy required of the drum 8a or 8b, an auxiliary device is provided which consists of a small sliding block 37 mounted in a slideway 38 and actuated by an arm 39 integral with the lever 32. A spring 40 carried by the arm 39 presses on the end of the sliding block 37 to move this block so that it engages the opening or notches 41 cut in the rim of the corresponding drum. The spring 40 entering the slot in the block 37 provides for yielding movement of the slide 37 relative to the arm 39 in the event that the slide hits the solid portion between the notches 41 of the drums. On entering a notch 41 the beveled point of the block cams the drum precisely to its reset or zero position.

The problem is not quite the same for the last drum 8c, since this drum carries only one zero mark on its circumference and a rotational movement up to half a turn may be necessary for its resetting. The above described arrangement of a toothed wheel 36 and pawl 34 is not suitable in this case for which the following device has been developed.

A small magnet bar 42 (see Figs. 2 and 4) is fastened on the shaft 20 on which the drum 8c is fastened. A magnetic field of constant polarity is produced by the electro-magnet 29 in the direction along which the bar is to be disposed in order to reset the drum 8c to zero. As the magnet bar 42 possesses a fixed polarity, there will be only one position of balance between the two magnetic fields. The magnetic field required for attraction is set up by the electro-magnet 29 when the supply circuit is closed, as above disclosed, concomitantly with the energization of the electro-magnet 21.

It may be possible to read the travel of the moving member of the machine directly on the drums 8a, 8b, 8c in the same way as it is done on a meter. Owing to the fact, however, that the scale divisions are very fine and close to each other, the same inconveniences would be encountered as those to which attention has been drawn at the beginning of the specification with reference to the drum graduations observed through an eye piece. With a view to eliminating this drawback, use may be made of a device that now will be disclosed.

The peripheral surface of each of the drums 8a, 8b, 8c is intensely illuminated by diffused light coming from a suitable source, not shown, so that this surface reflects the light beams in all directions. To this end, the surface of the drums should not be shiny. An objective lens 43 having a short focal length is interposed in the path of a portion of these beams and is far enough from the surface of the drum to ensure a magnification such that the image thrown on the screen can be read directly. The objective lens 43 is mounted in a sleeve that can be moved through a worm gear, not shown, to provide for the exact focussing on the screen 44.

Preferably, the light beams are tangential so as to bring into sharper relief the close divisions of the drums.

The screen 44, for instance, may be of opal glass and may accommodate the projections of the three drums 8a, 8b, 8c, as shown in Fig. 5. The screen carries a datum line 45 corresponding to the resetting to zero for the three drums. In this way, the reading may be made from a distance in the most convenient manner, thus obviating the necessity of constant care on the part of the operator who no longer is required to leave his work to read the indicator, thus saving time. In the example shown in Fig. 5, the reading is 221 cm., 4 mm. and $^{52}/_{100}$ mm., or 2214.52 mm. If required, the screen 44 may be given a slight curvature so as to provide a projection of the image on the screen as sharp as possible. However, this slight curvature is usually not considered to be essential since the depth of the field as a rule is sufficient to bring into sharp focussing on the screen all the points of the slight arc of the drum involved in each projection.

It will be clear from the above description that the accuracy of the apparatus in the first place depends on the precision of the size of the roller 2 which may be achieved to a high degree, in the second place on the accuracy of the divisions of the drum 8a which is required to record hundredths of a millimeter and, therefore, must be machined with the utmost care, and on the absence of play in the operation of this drum, a condition which is ensured since said drum is driven directly by the control roller 2, and finally on the lack of any slip of the roller 2 on its raceway 1, 1' due to the action of the presser rolls 3 or 3' and to the provision of suitable contact surfaces for the roller, roll and raceway.

Any play in the transmission to the other two drums 8b and 8c, though reduced to a minimum by a careful machining, is obviously of lesser importance.

All of the electro-magnets, as above described, are controlled by hand but within the scope of the invention the switches 50, 51, 53 may be automatically operated in response to any desired function of the machine. If the resetting is not effected during the whole forward movement and if one of the presser rolls 3 or 3' is kept in operation, the travel movements will be added together. If, on the other hand, during a run in the same direction, the presser roll in operation is changed, the control roller 2 will be rotated in the opposite direction, and the travel movements will be subtracted. Finally, during the forward or the return run if the resetting of the indicating apparatus is effected once or several times, independent indications will be obtained that neither add nor subtract and the length of travel shown each time will be between two successive positions, for instance, two machining positions in the case of a machine tool.

To show the ease of operation provided by the invention, an example of such operation will be given. Assuming that different holes A, B, C, D are to be drilled in a workpiece with reference to a datum line XX (see Fig. 6), the drilling head being located in the plane XX and arranged for drilling perpendicular to the plane of the paper, the indicator is reset to zero and the proper presser roll is put in engagement with the piano wire. The drilling head is moved upwards relative to the workpiece until the indicator shows the distance travelled A. To reach the position B, it is sufficient then to shift the head downwards without any alteration to the original arrangements in the apparatus until this height above the datum line is shown on the screen 44. In this operation the indication which in the first step had been built up to the distance A will be reduced to B. This being done, the apparatus is reset to zero and the drilling head is shifted further upwards until the indication C shows up on the screen. For the last change of position to the fourth drilling position, the apparatus is reset to zero and the presser roll is changed over to the other raceway since the distance to be measured is downwards instead of upwards. Then, by moving the drilling head downwards, the indication D will appear on the screen.

It is understood that the embodiment of the indicating device that has been described above and illustrated in the drawings is given merely as an example. Various modifications in its design may be made without departing from the scope of the invention.

Thus, in particular, the raceways instead of being constituted by taut wires might consist of straight bars to which a slight lateral shifting might be imparted to secure proper bearing contact on the roller 2 under the action of the presser roll 3 or 3'. Moreover, these raceways instead of being straight might be circular or, more generally, curvilinear in the case where the moving part itself follows a curvilinear path.

Also the illuminating means for the drums may be different and especially, if the available room is adequate, the illumination may be secured entirely by reflection, in which case the surface of the drums carrying the graduated divisions preferably is polished and shiny. The projection, however, may be effected through the drum wall which carries the graduations when this wall is translucent or transparent.

Obviously the number of graduated wheels or drums, as well as the number of divisions on each drum may also differ from those adopted in the above example.

What I claim is:

1. In a device for measuring relative movement between two members of a machine tool or the like movable relative to each other along a given path between two points spaced apart a substantial distance, the combination with said members, of a roller supported by one of said members for rotation thereof on an axis perpendicular to said path, a raceway supported by the other of said members with a free length thereof between supports substantially equal to said distance between said spaced points and substantially parallel to said given path, said raceway being in the form of an elongated flexible element capable upon flexure of being moved transversely of its length at any point along the effective length thereof between said supports, said roller and said raceway being supported by said members so as to be brought into contact with each other and to be disengaged from each other upon movement of said raceway transversely of said given path toward and away from said roller, means supported on one said member for effecting transverse movement of said raceway to engage said roller and to produce contact of said roller with said raceway and for effecting transverse movement of said raceway away from said roller to produce disengagement of said roller from said raceway, and indicating means operatively connected to said roller for indicating corresponding to rotation of said roller the measurement of the movement of said members of the machine tool relative to each other along said given path.

2. In a device for measuring the movement of a movable member of a machine tool or the like relative to a second member supporting said movable member for movement thereof along a given path, the combination with said members of a roller supported by said movable member for concurrent movement therewith along said path and for rotation about an axis perpendicular to the direction of said path, an elongated raceway supported by said second member, said raceway extending generally parallel to said path and being movable transversely of said path between a position out of engagement with said roller and a position in engagement with said roller for rolling contact of said roller therewith, means carried by said movable member for concurrent movement therewith along said path for effecting said movement of said raceway transversely of said defined path toward and away from said roller, and means operatively connected to said roller for indicating the rotation thereof and thereby the movement of said movable member of the machine tool along said given path.

3. In a device for measuring the movement of a movable member of a machine tool or the like the combination as defined in claim 2 which comprises a presser roll supported by said movable member adjacent said raceway for movement along said raceway with said movable member and with said roller, said presser roll being supported for rotation on its axis and for movement thereof transversely of said raceway toward and away from said roller respectively to engage said raceway to move said raceway into engagement with said roller and to release said raceway from said engagement with said roller, said presser roll when so engaged with said raceway cooperating with said raceway and said roller to produce rolling contact of said roller and said roll upon said raceway, means supported by said movable member and operatively connected to said presser roll to bias said presser roll toward engagement with said raceway, and means supported by said movable member and operatively connected to said presser roll and operable to oppose said bias means and to disengage said presser roll from said raceway and to effect release of said roller from rolling contact with said raceway.

4. A counter for integrating and indicating the integrated amount of a measurement comprising a rotatable element adapted to be rotated in accordance with the measurement to be made, a wheel having thereon a series of indicia of given order and continuously connected to said rotatable element to be rotated upon rotation of said rotatable element, a wheel having thereon a plurality of recurring indentical series of indicia of higher order arranged successively thereon about the axis thereof, a toothed wheel carried by said wheel of higher order coaxially therewith, the number of teeth in said toothed wheel being equal to the number of series of indicia carried upon said wheel of higher order, a double pointed pawl having the points thereof spaced apart a distance substantially equal to an odd multiple of one-half the pitch of the teeth of said toothed wheel, means for supporting said double pointed pawl for pivotal movement thereof upon a pivot intermediate between said points thereof and for movement of said pivot and said pawl toward and away from said toothed wheel, coupling means for effecting connection and disconnection of said wheel of higher order to and from said wheel of given order, and means cooperating with said coupling means and operatively connected to said pawl to effect upon disconnection of said wheel of higher order movement of said pawl into engagement with said toothed wheel with one of said points of said pawl entering into a space between two teeth of said toothed wheel to engage the flank of a tooth and to effect rotation of said toothed wheel and said wheel of higher order to a predetermined position of said series of indicia carried by said wheel of higher order about the axis thereof.

5. In a device for measuring the movement of a movable member of a machine tool or the like, the combination as defined in claim 2, which comprises a second raceway supported by said second member parallel to said first raceway at the opposite side of said roller from said first raceway, said second raceway also being movable transversely of said path, and means for effecting movement of said second raceway transversely of said path toward said roller to produce contact of said roller with said second raceway so that said roller is rotated upon subsequent movement of said roller along said defined path, and for effecting movement of said second raceway away from said roller to produce disengagement of said roller from said second raceway.

6. In a device for measuring the relative movement between two members, a roller mounted on one of the members, a raceway for said roller mounted on the other member, an indicator wheel continuously connected to said roller for indicating the travel of the roller along the raceway, a second indicator wheel of higher order, means operatively connecting said wheels including a clutch, means operable selectively to engage and disengage said roller and said raceway, and means effective concurrently with disengagement of the roller from the raceway to operate said clutch to disconnect said wheels and to simultaneously reset said wheels to initial positions, and effective concurrently with engagement of the roller and the raceway to operate the clutch to connect said wheels.

7. A counter comprising an indicating wheel having a plurality of recurring identical series of indicia arranged peripherally thereon, a toothed wheel carried by said indicating wheel coaxially therewith, the number of teeth in said toothed wheel being equal to the number of said recurring series of indicia, a double pointed pawl having the points thereof spaced apart a distance substantially equal to an odd multiple of one-half the pitch of the teeth of said toothed wheel, means supporting said double pointed pawl for movement about a pivot intermediate its points and for bodily movement of said pivot and said pawl toward and away from said toothed wheel, means for operating said pawl into engagement with said toothed wheel, whereby one or the other of said points enters into a space between two teeth of said toothed wheel to engage a flank of a tooth and thereby effect rotation of said toothed wheel and said indicating wheel to a predetermined position of said series of indicia, a detent supported for movement toward and away from said indicating wheel, means operatively connecting said detent to said pawl for movement of said detent toward and away from said indicating wheel upon bodily movement of said pivot and said pawl toward and away from said toothed wheel, said indicating wheel having a plurality of notches peripherally spaced corresponding to said plurality of recurring series of indicia and adapted to be engaged by said detent when said pawl engages a tooth of said toothed wheel, so as precisely to position said indicating wheel and said indicia thereon.

8. A counter comprising an indicating wheel having a plurality of recurring identical series of indicia arranged peripherally thereon, a toothed wheel carried by said indicating wheel coaxially therewith, the number of teeth in said toothed wheel being equal to the number of said recurring series of indicia, a double pointed pawl having the points thereof spaced apart a distance substantially equal to an odd multiple of one-half the pitch of the teeth of said toothed wheel, means supporting said double pointed pawl for movement about a pivot intermediate between its points and for bodily movement of said pivot and said pawl toward and away from said toothed wheel, means for operating said pawl into engagement with said toothed wheel, whereby one or the other of said points enters into a space between two teeth of said toothed wheel to engage a flank of a tooth and thereby effect rotation of said toothed wheel and said indicating wheel to a predetermined position of said series of indicia, said means supporting said double pointed pawl comprising a lever supported for pivotal movement thereof toward and away from said toothed wheel, said double pointed pawl being pivotally supported on said lever outwardly from the pivotal axis of said lever and so that upon pivotal movement of said lever said points of said pawl are moved toward and away from said toothed wheel, and means connected to said lever and said pawl to bias said pawl to a given position relative to said lever for initial engagement of a selected one of said double points of said pawl with said toothed wheel, said biasing means permitting pivotal movement of said pawl against said bias upon engagement of said selected point with a tooth of said wheel preventing entrance of said selected point into a space between the teeth and thereby to effect movement of said other point of said pawl into a space between the teeth of said toothed wheel to engage the flank of a tooth and to rotate said toothed wheel and said indicating wheel to said predetermined position of said indicia.

9. A counter as defined in claim 8 which comprises a detent operatively connected to said lever so as to be moved toward and away from said indicating wheel respectively upon pivotal movement of said lever toward and away from said toothed wheel, said indicating wheel having a plurality of notches peripherally disposed corresponding to said plurality of recurring series of indicia and adapted to be engaged by said detent when said pawl engages a tooth of said toothed wheel so as precisely to position said indicating wheel and said indicia thereon.

10. In a device for measuring the relative movement between two members of a machine tool or the like movable relative to each other along a given path between two points spaced apart a substantial distance, the combination with said members of a roller supported by one of said members for rotation thereof on its axis, a raceway supported by the other of said members with its length substantially parallel to said given path, said roller and said raceway being fixed on their respective members against movement relative thereto in either direction parallel to said path and being movable relative to each other lengthwise of said raceway concomitantly with said relative movement of said members, said roller and said raceway being supported for movement of said roller and said raceway toward and away from each other transversely of said given path at any point along the effective length of said raceway, means carried by said roller supporting member for concurrent movement therewith along said path and actuatable for effecting said transverse movement of said roller and said raceway toward each other to produce rolling contact of said roller with said raceway and for effecting said transverse movement of said roller and said raceway away from each other to produce disengagement of said roller from said raceway, a second raceway supported by the member of said machine tool which supports said first raceway, said second raceway being substantially coextensive with and supported in position parallel to said first raceway at the opposite side of said roller from said first raceway and for relative movement of said roller and said second raceway toward and away from each other transversely of said given path at any point along the effective length of said second raceway, means carried by said roller supporting member for concurrent movement therewith along said path and actuatable for effecting said relative transverse movement of said roller and said second raceway toward each other to produce rolling contact of said roller with said second raceway and for effecting said relative transverse movement of said roller and said second raceway away from each other to produce disengagement of said roller from said second raceway, and indicating means operatively connected to said roller for indicating corresponding to the rotation of said roller in engagement with the respective raceways the measurements of the movements of said members of said machine tool relative to each other along said given path.

11. In a device for measuring the relative movement between two members of a machine tool or the like movable relative to each other along a given path between two points spaced apart a substantial distance, the combination with said members of a roller supported by one of said members for rotation thereof on its axis, a raceway supported by the other of said members with its length substantially parallel to said given path, said roller and said raceway being fixed on their respective members against movement relative thereto in either direction parallel to said path and being movable relative to each other lengthwise of said raceway concomitantly with said relative movement of said members, said roller and said raceway being supported for movement of said roller and said raceway toward and away from each other transversely of said given path at any point along the effective length of said raceway, a presser roll supported by said roller supporting member for movement of said presser roll lengthwise of and relative to said raceway with said roller supporting member and said roller concomitantly with said relative movement of said members, said presser being supported for rotation on its axis and for movement thereof and of said roller relative to each other transversely of the length of said raceway to produce concomitant engagement of said presser roll and said roller with said raceway and rolling contact of said roller and said roll upon said raceway, means operatively connected to said presser roll and operable for effecting said movement thereof relative to said roller for producing said engagement of said roller with and disengagement thereof from said raceway, and indicating means operatively connected to said roller for indicating corresponding to rotation of said roller the measurement of the movement of said members of the machine tool relative to each other along said given path.

CHARLES WILLIAM BERTHIEZ.

REFERENCES CITED

The following references are of record in the file of this patent:

UNITED STATES PATENTS

| Number | Name | Date |
|---|---|---|
| 670,075 | Heinitz | Mar. 19, 1901 |
| 1,015,305 | Fentzhoff | Jan. 23, 1912 |
| 1,166,596 | Johnson | Jan. 4, 1916 |
| 1,357,731 | Schaper | Nov. 2, 1920 |
| 1,600,319 | Cox | Sept. 21, 1926 |
| 1,696,087 | Harris | Dec. 18, 1928 |
| 1,714,099 | Farmer | May 21, 1929 |
| 2,221,063 | Teague et al. | Nov. 12, 1940 |
| 2,421,581 | Scott | June 3, 1947 |

FOREIGN PATENTS

| Number | Country | Date |
|---|---|---|
| 1,760 | France | Nov. 12, 1845 |
| 557,069 | Great Britain | Nov. 3, 1943 |